United States Patent
Park

(10) Patent No.: US 11,207,969 B2
(45) Date of Patent: Dec. 28, 2021

(54) HYBRID POWERTRAIN FOR VEHICLES

(71) Applicants: Hyundai Motor Company, Seoul (KR); Kia Motors Corporation, Seoul (KR)

(72) Inventor: Jong Yun Park, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 7 days.

(21) Appl. No.: 16/898,166

(22) Filed: Jun. 10, 2020

(65) Prior Publication Data
US 2021/0260985 A1 Aug. 26, 2021

(30) Foreign Application Priority Data
Feb. 25, 2020 (KR) .................. 10-2020-0022646

(51) Int. Cl.
*B60K 6/54* (2007.10)
*B60K 17/16* (2006.01)
*B60K 6/26* (2007.10)
*B60K 6/365* (2007.10)
*B60K 6/38* (2007.10)
*B60K 6/48* (2007.10)
*F16D 23/02* (2006.01)
*F16H 37/08* (2006.01)
*F16H 37/06* (2006.01)
*B60K 6/383* (2007.10)

(52) U.S. Cl.
CPC .................. *B60K 6/54* (2013.01); *B60K 6/26* (2013.01); *B60K 6/365* (2013.01); *B60K 6/38* (2013.01); *B60K 6/383* (2013.01); *B60K 6/48* (2013.01); *B60K 17/16* (2013.01); *F16D 23/025* (2013.01); *F16H 37/065* (2013.01); *F16H 37/0806* (2013.01); *B60K 2006/4808* (2013.01); *B60K 2006/4825* (2013.01); *B60K 2006/4841* (2013.01)

(58) Field of Classification Search
CPC ........... B60K 6/54; B60K 6/365; B60K 6/38; B60K 6/48; F16H 37/0806
See application file for complete search history.

(56) References Cited

U.S. PATENT DOCUMENTS

2015/0298535 A1* 10/2015 Luehrs ................... B60K 6/547
477/3
2016/0167503 A1* 6/2016 Lee .......................... B60K 6/48
475/5

FOREIGN PATENT DOCUMENTS

KR   10-2015-0069194 A    6/2015

* cited by examiner

*Primary Examiner* — Derek D Knight
(74) *Attorney, Agent, or Firm* — Morgan, Lewis & Bockius LLP

(57) ABSTRACT

A hybrid powertrain may include an engine input shaft connected to an engine by a main clutch, a motor input shaft mounted coaxially with the engine input shaft and connected to a motor, a center synchronizer installed to interrupt connection between the engine input shaft and the motor input shaft, first and second output shafts mounted parallel to the engine input shaft, a variable driving gear provided on the motor input shaft to maintain or increase a rotation speed of the motor input shaft and then to transmit the maintained or increased rotation speed to the first output shaft, and plural external gear pairs installed to form different transmission gear ratios between the engine input shaft and the first output shaft and between the engine input shaft and the second output shaft.

16 Claims, 10 Drawing Sheets

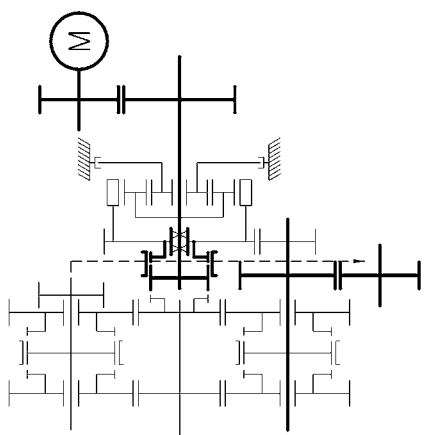
FIG. 2C
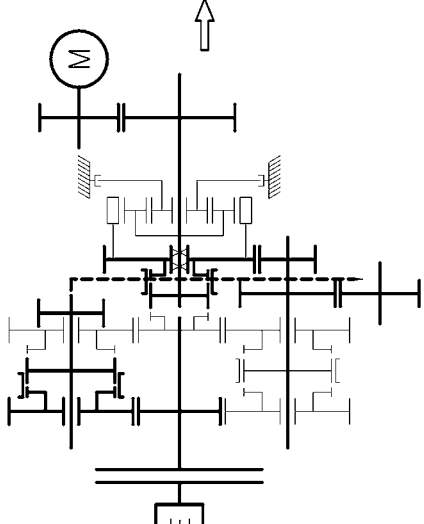
FIG. 2B
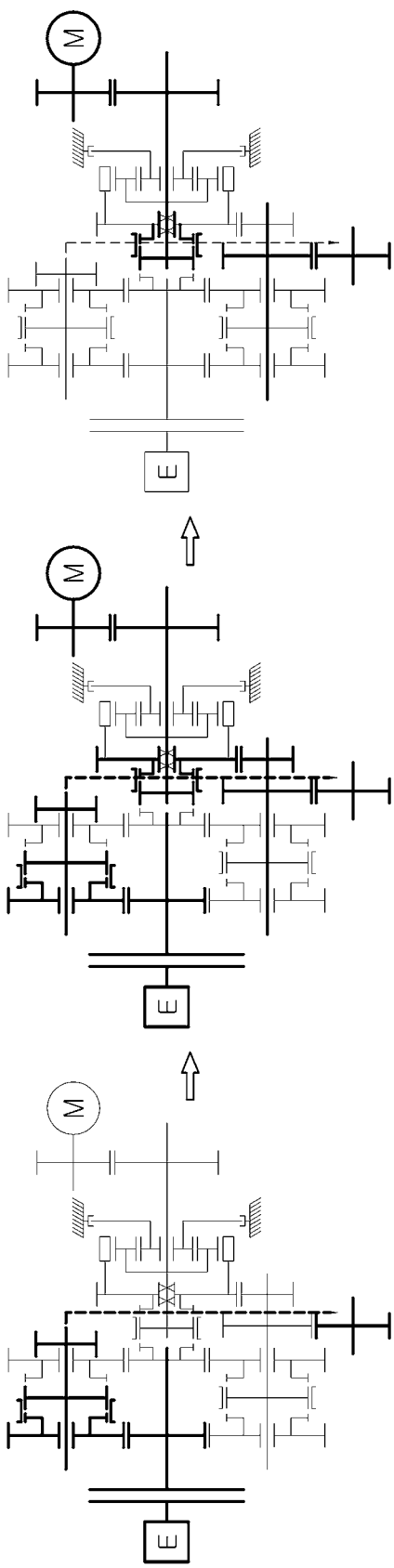
FIG. 2A
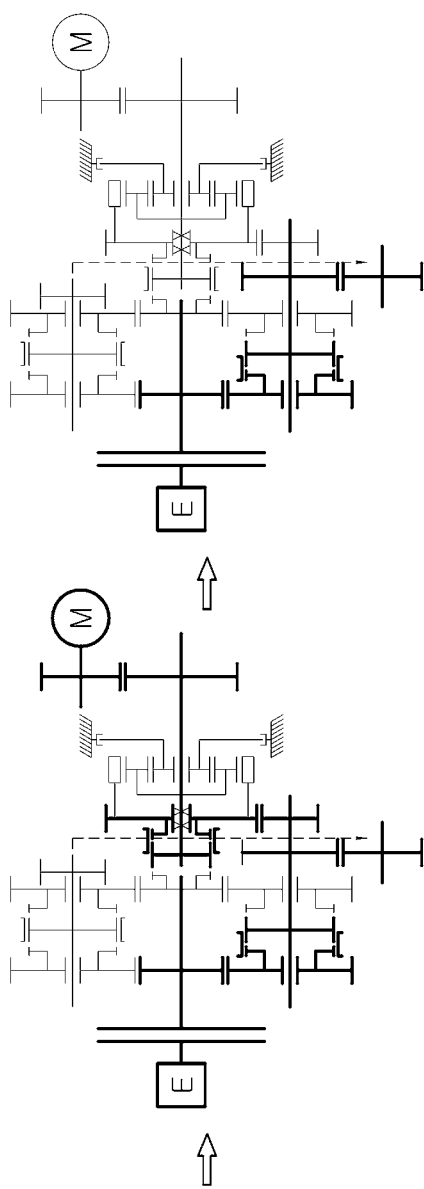
FIG. 2E
FIG. 2D

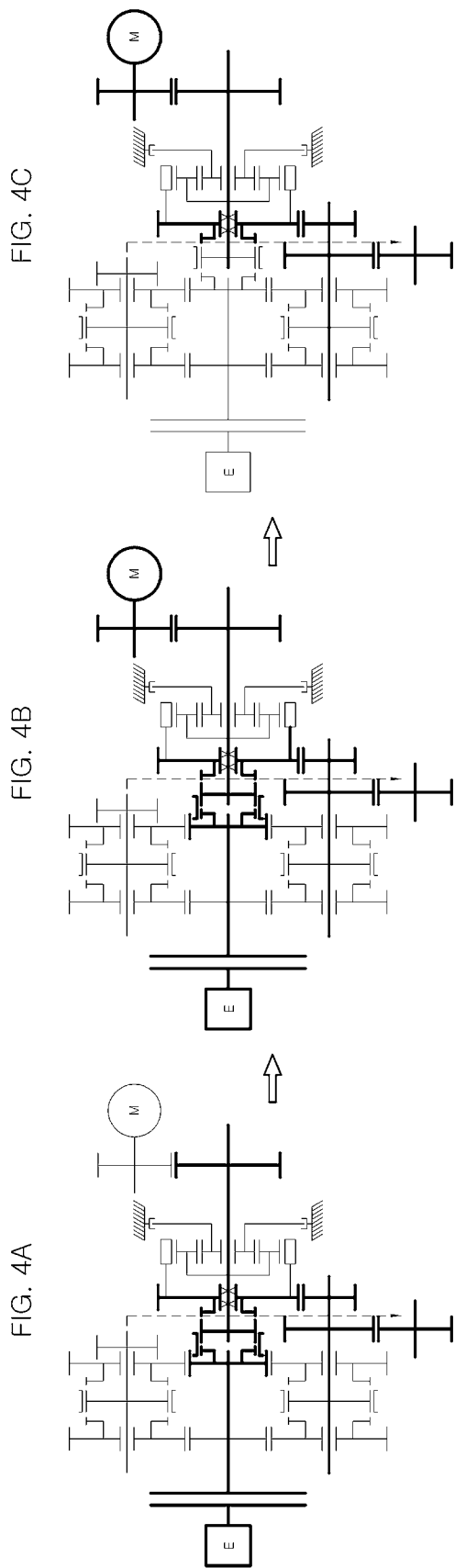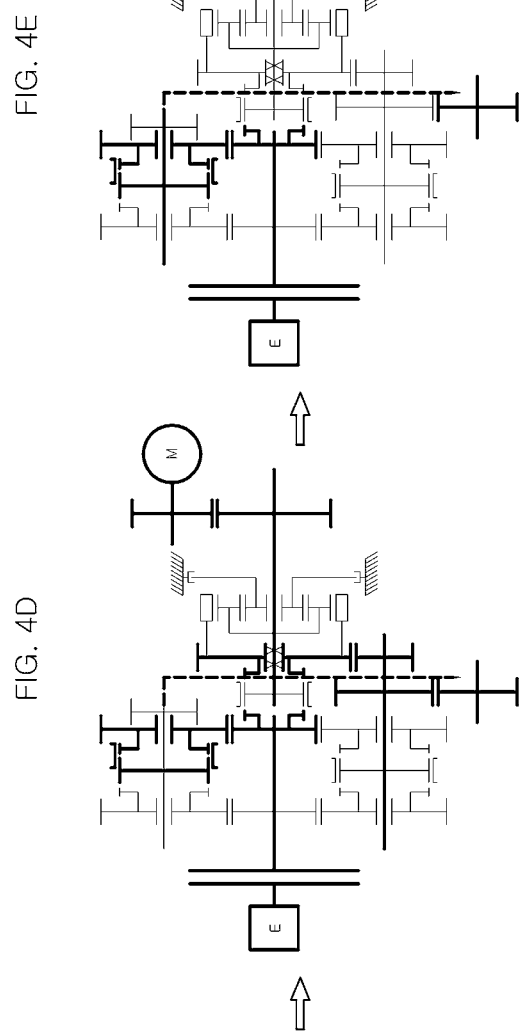
FIG. 4A
FIG. 4B
FIG. 4C
FIG. 4D
FIG. 4E

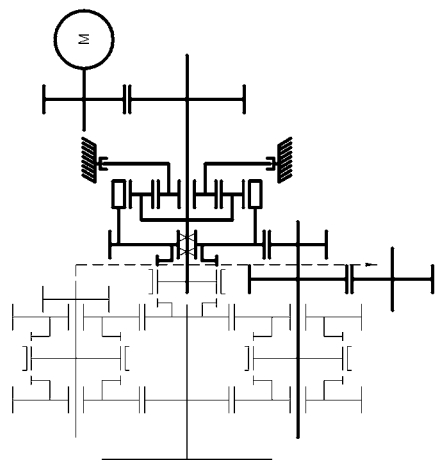
FIG. 5A
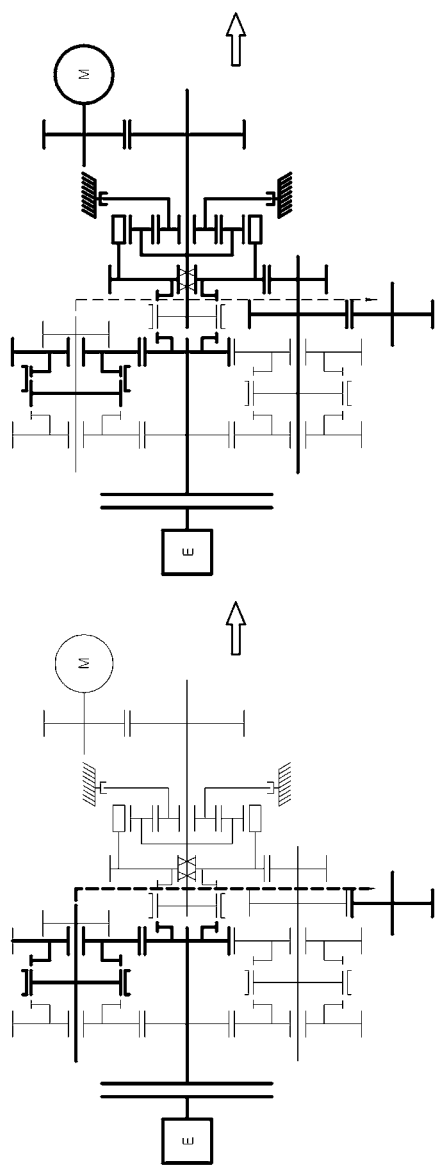
FIG. 5B
FIG. 5C
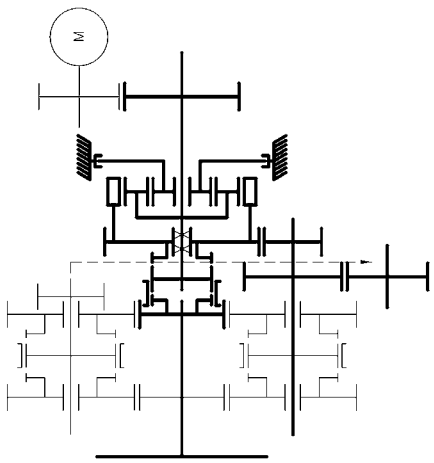
FIG. 5E
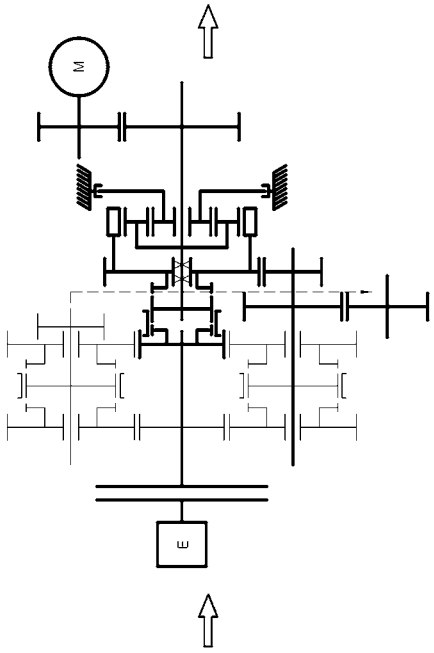
FIG. 5D

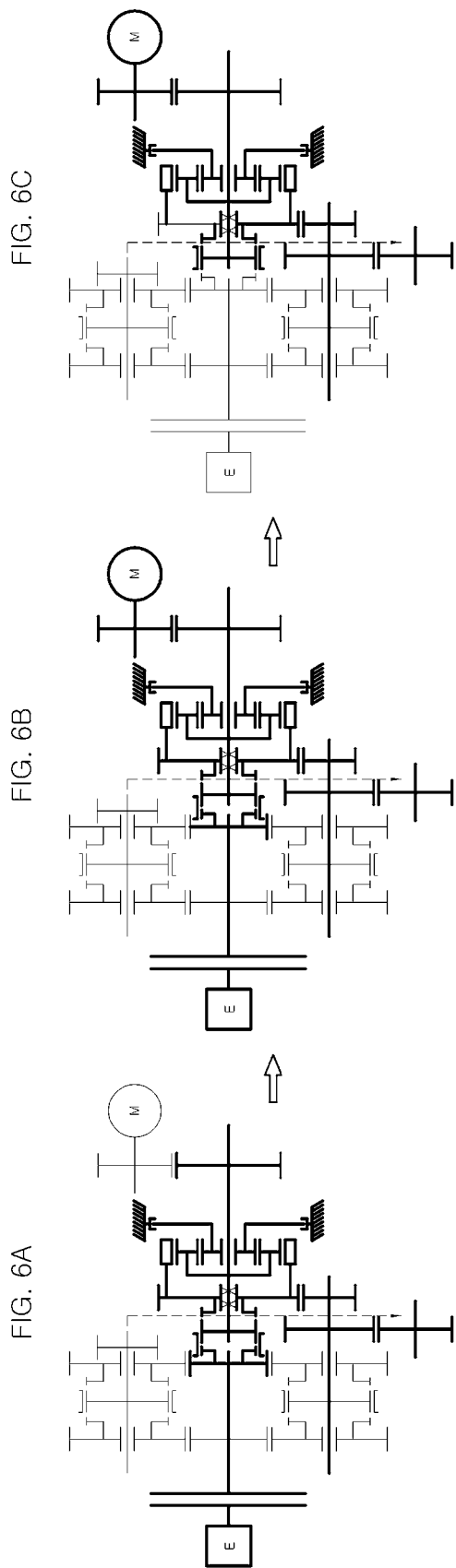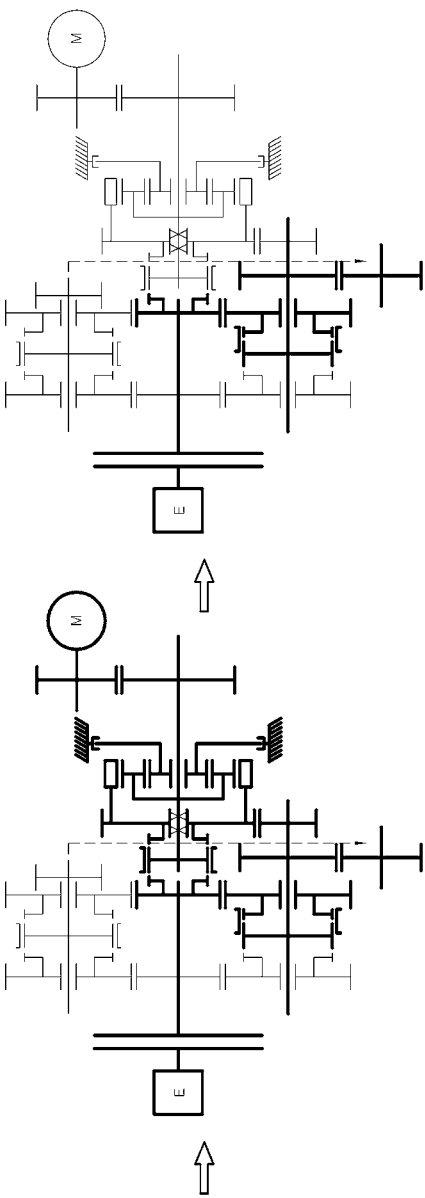

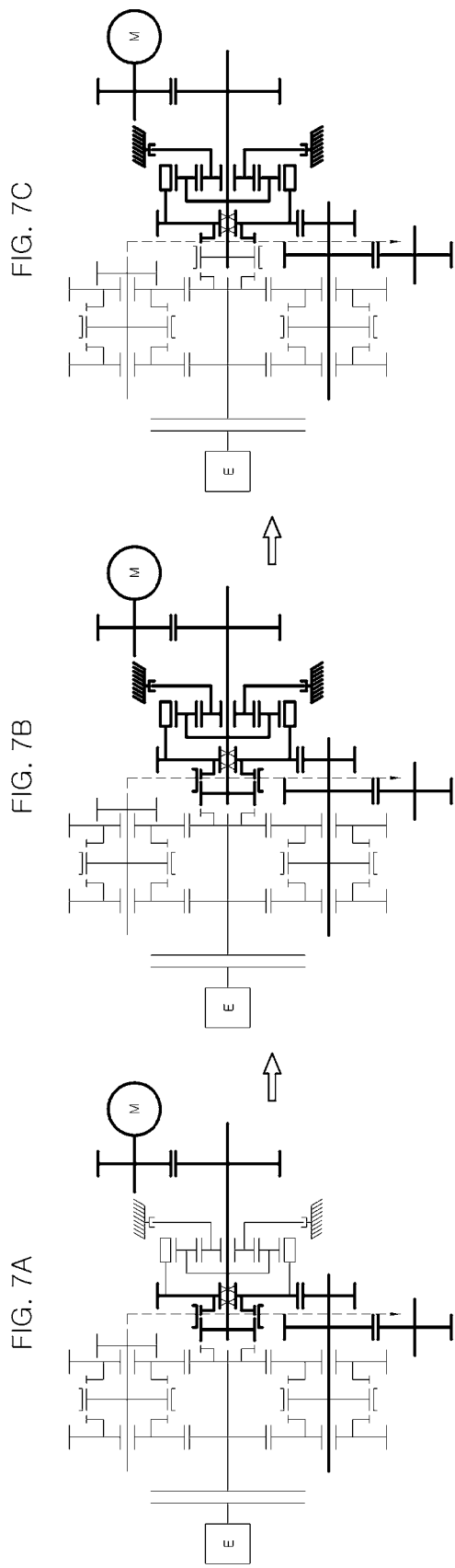

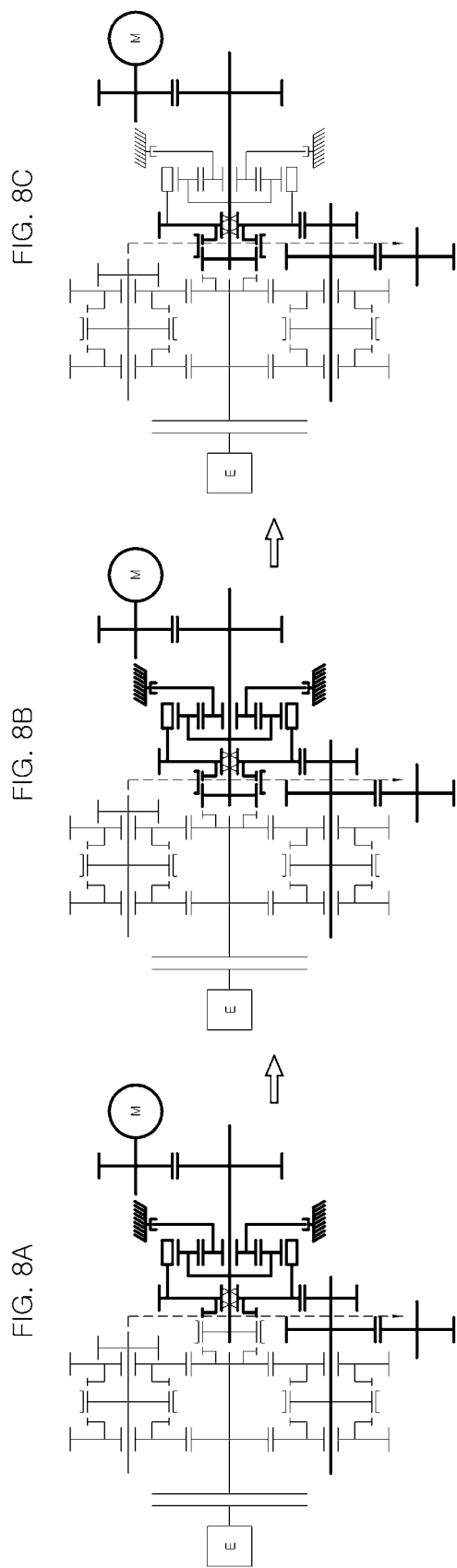

HYBRID POWERTRAIN FOR VEHICLES

CROSS-REFERENCE TO RELATED APPLICATION

The present application claims priority to Korean Patent Application No. 10-2020-0022646, filed on Feb. 25, 2020, in the Korean Intellectual Property Office, the entire contents of which is incorporated herein for all purposes by this reference.

BACKGROUND OF THE INVENTION

Field of the Invention

The present invention relates to a layout of a hybrid powertrain which is applicable to a vehicle.

Description of Related Art

An automated manual transmission (AMT) is generally considered as the most competitive transmission among automated transmissions in terms of production cost, material costs and fuel efficiency, but lowers the marketability of a vehicle due to torque interruption occurring during shifting, and therefore has not been widely adopted.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hybrid powertrain which may improve shift feeling by eliminating torque interruption, which is a disadvantage of an automated manual transmission (AMT), using a motor, while reinforcing the advantages of the AMT, and obviate a clutch between the motor and an engine, required by a conventional hybrid powertrain in which the motor is located between the engine and a transmission, to improve ease of mounting of a transmission in a vehicle due to a reduction in the overall length of the transmission, to reduce the weight and production cost of the transmission, and to contribute to improvement in fuel efficiency of the vehicle.

In accordance with various aspects of the present invention, the above and other objects can be accomplished by the provision of a hybrid powertrain for vehicles including an engine input shaft connected to an engine by a main clutch, a motor input shaft mounted to be coaxial with the engine input shaft and engaged to a motor, a center synchronizer installed to interrupt connection between the engine input shaft and the motor input shaft, a first output shaft and a second output shaft each mounted parallel to the engine input shaft, a variable driving gear provided on the motor input shaft to maintain or increase a rotation speed of the motor input shaft and then to transmit the maintained or increased rotation speed to the first output shaft, and a plurality of external gear pairs installed to form different transmission gear ratios between the engine input shaft and the first output shaft and between the engine input shaft and the second output shaft, wherein a plurality of transmission gear ratios, formed by the plurality of external gear pairs, and two transmission gear ratios, formed when the variable driving gear transmits power to the first output shaft, form a series of the different transmission gear ratios used to drive the vehicle.

The variable driving gear may be installed on the motor input shaft through a one-way clutch configured to transmit power in a direction from the motor input shaft to the variable driving gear, and be connected integrally to a third rotation element of a planetary gear set including a first rotation element provided to be fixable by a brake to a transmission housing, and a second rotation element connected to the motor input shaft.

The variable driving gear may be configured to be locked onto the motor input shaft by the center synchronizer.

The center synchronizer may include a hub installed on the motor input shaft, and a sleeve installed to be slidable on the hub in an axial direction thereof, and configured to be directly connected to the engine input shaft when the sleeve is moved to one side and to be directly connected to the variable driving gear when the sleeve is moved to a remaining side.

The center synchronizer may be connected to the engine input shaft by provided as a synchronization device configured to perform synchronous interaction using a synchronizer ring, and be connected to the variable driving gear by provided as a dog clutch.

The external gear pairs between the engine input shaft and the first output shaft may be installed to implement a transmission gear ratio of a second speed stage and a transmission gear ratio of a sixth gear stage, the external gear pairs between the engine input shaft and the second output shaft may be installed to implement a transmission gear ratio of a first speed stage and a transmission gear ratio of a fourth gear stage, and the variable driving gear may be installed to transmit power to the first output shaft at a transmission gear ratio of a third speed stage and a transmission gear ratio of a fifth gear stage.

A first driving gear used to implement the transmission gear ratio of the first speed stage and the transmission gear ratio of the second speed stage in common and a second driving gear used to implement the transmission gear ratio of the fourth speed stage and the transmission gear ratio of the sixth speed stage in common may be installed on the engine input shaft, a driven gear for the second speed stage engaged with the first driving gear and a driven gear for the sixth speed stage engaged with the second driving gear may be installed on the first output shaft, and a driven gear for the first speed stage engaged with the first driving gear and a driven gear for the fourth speed stage engaged with the second driving gear may be installed on the second output shaft.

The first driving gear and the second driving gear may be installed on the engine input shaft such that rotation thereof is locked onto the engine input shaft, a second and sixth speed stage synchronization device configured to selectively lock rotation of the driven gear for the second speed stage and the driven gear for the sixth speed stage onto the first output shaft may be provided on the first output shaft, and a first and fourth speed stage synchronization device configured to selectively lock rotation of the driven gear for the first speed stage and the driven gear for the fourth speed stage onto the second output shaft may be provided on the second output shaft.

A clutch gear configured to form a portion of the center synchronizer may be integrally provided on the second driving gear.

A first output gear may be provided on the first output shaft, a second output gear may be provided on the second output shaft, and the first output gear and the second output gear may be in common engaged with a ring gear of a differential device.

A motor driven gear configured to receive power from the motor may be provided integrally with the motor input shaft, and a motor driving gear provided on a rotation shaft of the motor may be engaged with the motor driven gear.

A rotation shaft of the motor may be directly connected to the motor input shaft.

The motor input shaft may be connected to the motor by a planetary gear set for reducing a rotation speed of the motor and then to transmit the reduced rotation speed to the motor input shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2A, FIG. 2B, FIG. 2C, FIG. 2D and FIG. 2E are diagrams illustrating a process of shifting from a first speed stage to a second speed stage in the powertrain of FIG. 1;

FIG. 4A, FIG. 4B, FIG. 4C, FIG. 4D and FIG. 4E are diagrams illustrating a process of shifting from the third speed stage to a fourth speed stage in the powertrain of FIG. 1;

FIG. 5A, FIG. 5B, FIG. 5C, FIG. 5D and FIG. 5E are diagrams illustrating a process of shifting from the fourth speed stage to a fifth speed stage in the powertrain of FIG. 1;

FIG. 6A, FIG. 6B, FIG. 6C, FIG. 6D and FIG. 6E are diagrams illustrating a process of shifting from the fifth speed stage to a sixth speed stage in the powertrain of FIG. 1;

FIG. 7A, FIG. 7B and FIG. 7C are diagrams illustrating a process of shifting from the first speed stage to the second speed stage in the powertrain of FIG. 1 in an electric vehicle mode;

FIG. 8A, FIG. 8B and FIG. 8C are diagrams illustrating a process of shifting from the second speed stage to the first speed stage in the powertrain of FIG. 1 in the electric vehicle mode;

Figure 1:
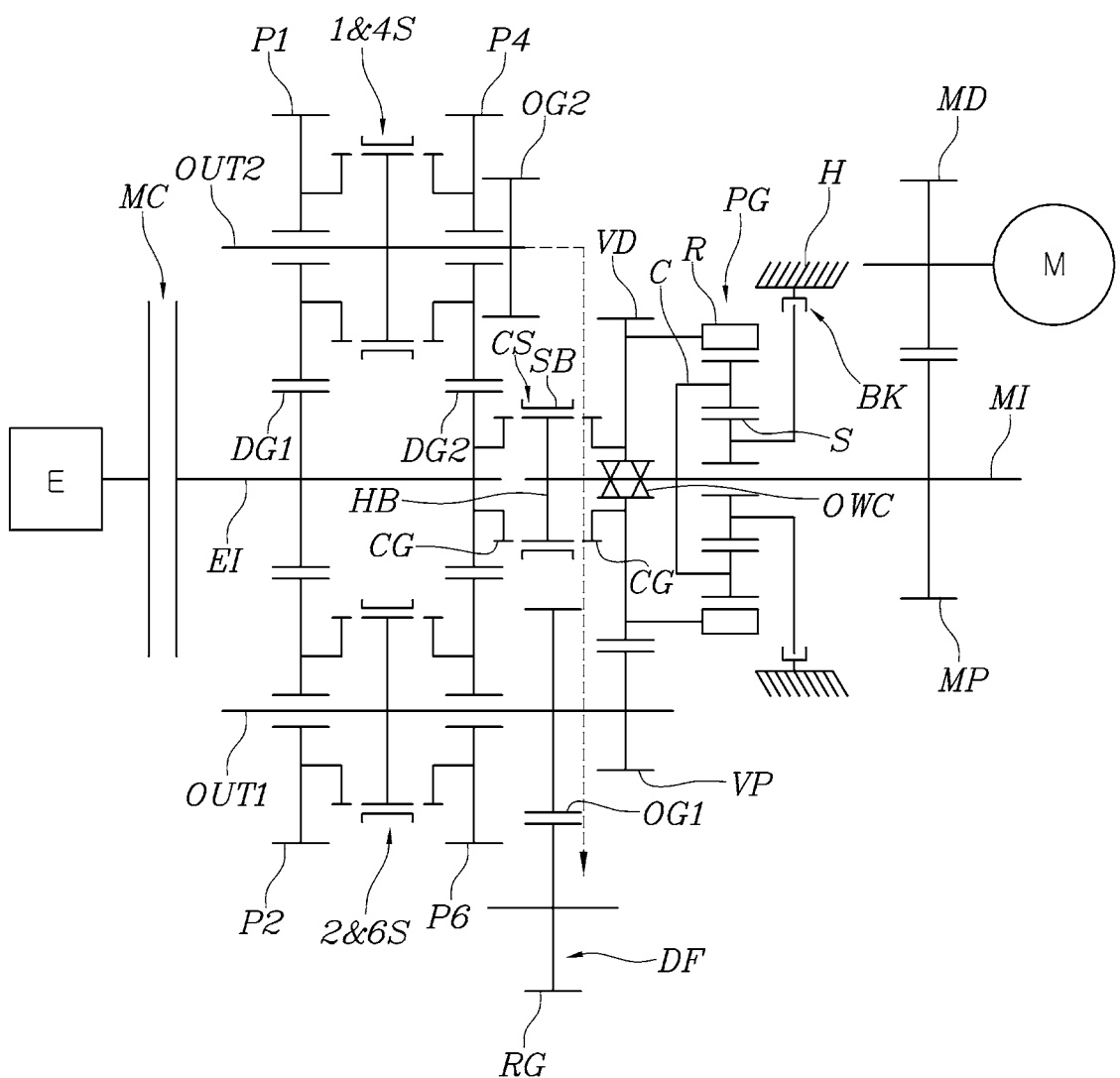
FIG. 1 is a diagram illustrating a hybrid powertrain for vehicles according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to exemplary embodiments of the present invention, examples of which are illustrated in the accompanying drawings. Wherever possible, the same reference numbers will be used throughout the drawings to refer to the same or like parts.

Referring to FIG. 1, a hybrid powertrain for vehicles according to an exemplary embodiment of the present invention includes an engine input shaft EI which is connected to an engine E by a main clutch MC, a motor input shaft MI which is mounted to be coaxial with the engine input shaft EI and is connected to a motor M, a center synchronizer CS installed to interrupt connection between the engine input shaft EI and the motor input shaft MI, a first output shaft OUT1 and a second output shaft OUT2 which are mounted parallel to the engine input shaft EI, a variable driving gear VD which is provided on the motor input shaft MI to maintain or increase the rotation speed of the motor input shaft MI and then to transmit the maintained or increased rotation speed to the first output shaft OUT1, and a plurality of external gear pairs which is installed to form different transmission gear ratios between the engine input shaft EI and the first output shaft OUT1 and between the engine input shaft EI and the second output shaft OUT2.

A plurality of transmission gear ratios, which is formed by the plurality of external gear pairs, and two transmission gear ratios, which is formed when the variable driving gear VD transmits power to the first output shaft OUT1, form a series of the different transmission gear ratios used to drive the vehicle.

That is, in the exemplary embodiment of the present invention, the plurality of external gear pairs is provided to form transmission gear ratios of first, second, fourth and sixth gear stages, the variable driving gear VD forms a transmission gear ratio of a third gear stage, when the variable driving gear VD maintains the rotation speed of the motor input shaft MI and then transmits the maintained rotating speed, and forms a transmission gear ratio of a fifth gear stage, when the variable driving gear VD increases the rotation speed of the motor input shaft MI and then transmits the increased rotating speed, and thereby, the vehicle may implement a series of transmission gear ratios, i.e., the transmission gear ratios of the first to sixth gear stages.

The powertrain according to an exemplary embodiment of the present invention may implement first to sixth forward speeds through the plurality of external gear pairs and the variable driving gear VD using power of the engine E which the engine input shaft EI receives through the main clutch MC, and perform smooth shifting without torque interruption caused by shifting, as will be described later.

The variable driving gear VD is installed on the motor input shaft MI through a one-way clutch OWC, which transmits power only in a direction from the motor input shaft MI to the variable driving gear VD.

Therefore, the power of the motor input shaft MI drives the variable driving gear VD only when the motor input shaft MI is rotated in a forward direction at a higher speed than the variable driving gear VD.

Here, the forward direction means a direction in which the motor input shaft MI and the engine input shaft EI are rotated to drive the vehicle forwards.

Furthermore, the variable driving gear VD is connected integrally to a third rotation element of a planetary gear set PG including a first rotation element which is provided to be fixable by a brake BK, and a second rotation element which is connected to the motor input shaft MI.

Here, the first rotation element of the planetary gear set PG is a sun gear S, the second rotation element is a planet carrier, and the third rotation element is a ring gear R.

That is, the variable driving gear VD is installed on the motor input shaft MI through the planetary gear set PG and the one-way clutch OWC, and may thus maintain or increase the rotation speed of the motor input shaft MI and then to transmit the power of the motor input shaft MI having the maintained or increased rotation speed to the first output shaft OUT1.

Because, under the condition that the brake BK is not engaged, power is transmitted from the motor input shaft MI to the variable driving gear VD when the motor input shaft MI is rotated in the forward direction at a higher speed than the variable driving gear VD, the variable driving gear VD transmits the power of the motor input shaft MI to the first output shaft OUT1 without a change in the rotation speed of the motor input shaft MI, and the planet carrier C of the planetary gear set PG is directly connected to the motor input shaft MI and thus, in the instant case, the entirety of the planetary gear set PG is rotated at the same speed as the variable driving gear VD.

Because, under the condition that the brake BK is engaged, the sun gear S of the planetary gear set PG is fixed to transmission housing H and thus the power of the motor input shaft MI transmitted to the planet carrier C drives the ring gear R and the variable driving gear VD at an increased speed, the power of the motor input shaft MI having the increased rotation speed is transmitted to the first output shaft OUT1, and in the instant case, the one-way clutch C allows the variable driving gear VD to be rotated at a higher speed than the motor input shaft MI.

The variable driving gear VD is configured to be locked onto the motor input shaft MI by the center synchronizer CS.

That is, the center synchronizer CS includes a hub installed on the motor input shaft MI, and a sleeve SB installed to be slidable on the hub HB in an axial direction and configured to be directly connected to the engine input shaft EI when the sleeve SB is moved to one side and to be directly connected to the variable driving gear VD when the sleeve SB is moved to the other side.

For reference, the "axial direction" means the longitudinal direction of the motor input shaft MI.

The center synchronizer CS is connected to the engine input shaft EI by provided as a synchronization device which performs synchronous interaction using a synchronizer ring, and is connected to the variable driving gear VD by provided as a dog clutch.

In the exemplary embodiment of the present invention, a clutch gear CG constituting a portion of the composite synchronizer CS is provided integrally with a second driving gear DG2, which will be described later, on the engine input shaft EI, and is configured to directly connect the engine input shaft EI to the motor input shaft MI by engaging the sleeve SB with the clutch gear CG.

Furthermore, the synchronizer ring is provided between the clutch gear CG of the second driving gear DG2 and the sleeve SB, and the sleeve SB is engaged with the clutch gear CG of the second driving gear DG2 by synchronous interaction of the synchromesh-type synchronization device.

For reference, the synchronizer ring is generally used in conventional synchromesh-type synchronization devices, and an illustration thereof will thus be omitted from the drawings.

As described above, the center synchronizer CS is connected to the variable driving gear VD by provided as the dog clutch, and the reason for this is to actively perform synchronous interaction by the motor M and the brake BK.

Of course, the clutch gear CG is provided integrally with the variable driving gear VD, and thus, when the sleeve SB is moved to the other side (rightwards in FIG. 1), the sleeve SB is engaged with the clutch gear CG.

The external gear pairs between the engine input shaft EI and the first output shaft OUT1 are installed to implement the transmission gear ratio of the second speed stage and the transmission gear ratio of the sixth gear stage, the external gear pairs between the engine input shaft EI and the second output shaft OUT2 are installed to implement the transmission gear ratio of the first speed stage and the transmission gear ratio of the fourth gear stage, and the driving gear VD is installed to transmit power to the first output shaft OUP1 at the transmission gear ratio of the third speed stage and the transmission gear ratio of the fifth gear stage.

That is, a first driving gear DG1, which is used to implement the transmission gear ratio of the first speed stage and the transmission gear ratio of the second speed stage in common, and the second driving gear DG2, which is used to implement the transmission gear ratio of the fourth speed stage and the transmission gear ratio of the sixth speed stage in common, are installed on the engine input shaft EI, a driven gear P2 for the second gear stage, which is engaged with the first driving gear DG1, and a driven gear P6 for the sixth gear stage, which is engaged with the second driving gear DG2, are installed on the first output shaft OUT1, and a driven gear P1 for the first gear stage, which is engaged with the first driving gear DG1, and a driven gear P4 for the fourth gear stage, which is engaged with the second driving gear DG2, are installed on the second output shaft OUT2.

The first driving gear DG1 and the second driving gear DG2 are installed on the engine input shaft EI such that rotation thereof is locked onto the engine input shaft EI, a second and sixth speed stage synchronization device 2&6S configured to selectively lock rotation of the driven gear P2 for the second speed stage and the driven gear P6 for the sixth speed stage onto the first output shaft OUT1 is provided on the first output shaft OUT1, and a first and fourth speed stage synchronization device 1&4S configured to selectively lock rotation of the driven gear P1 for the first speed stage and the driven gear P4 for the fourth speed stage onto the second output shaft OUT2 is provided on the second output shaft OUT2.

Furthermore, a first output gear OG1 is provided on the first output shaft OUT1, a second output gear OG2 is provided on the second output shaft OUT2, and the first output gear OG1 and the second output gear OG2 are in common engaged with a ring gear RG of a differential device DF to output power to driving wheels.

Furthermore, a variable driven gear VP, which is engaged with the variable driving gear VD, is installed on the first output shaft OUT1 such that rotation of the variable driven gear VP is locked onto the first output shaft OUT1, being configured for transmitting power from the variable driving gear VD to the first output shaft OUT1.

The above-described configuration is applied in common to all of embodiments of the present invention, in an exemplary embodiment shown in FIG. 1, a motor driven gear MP for receiving power from the motor M is provided integrally with the motor input shaft MI1, and a motor driving gear MD provided on a rotation shaft of the motor M is engaged with the motor driven gear MP.

Therefore, the rotating power of the motor M is changed by a gear ratio of the motor driving gear MD to the motor driven gear MP, and is then transmitted to the motor input shaft MI.

Figure 9:
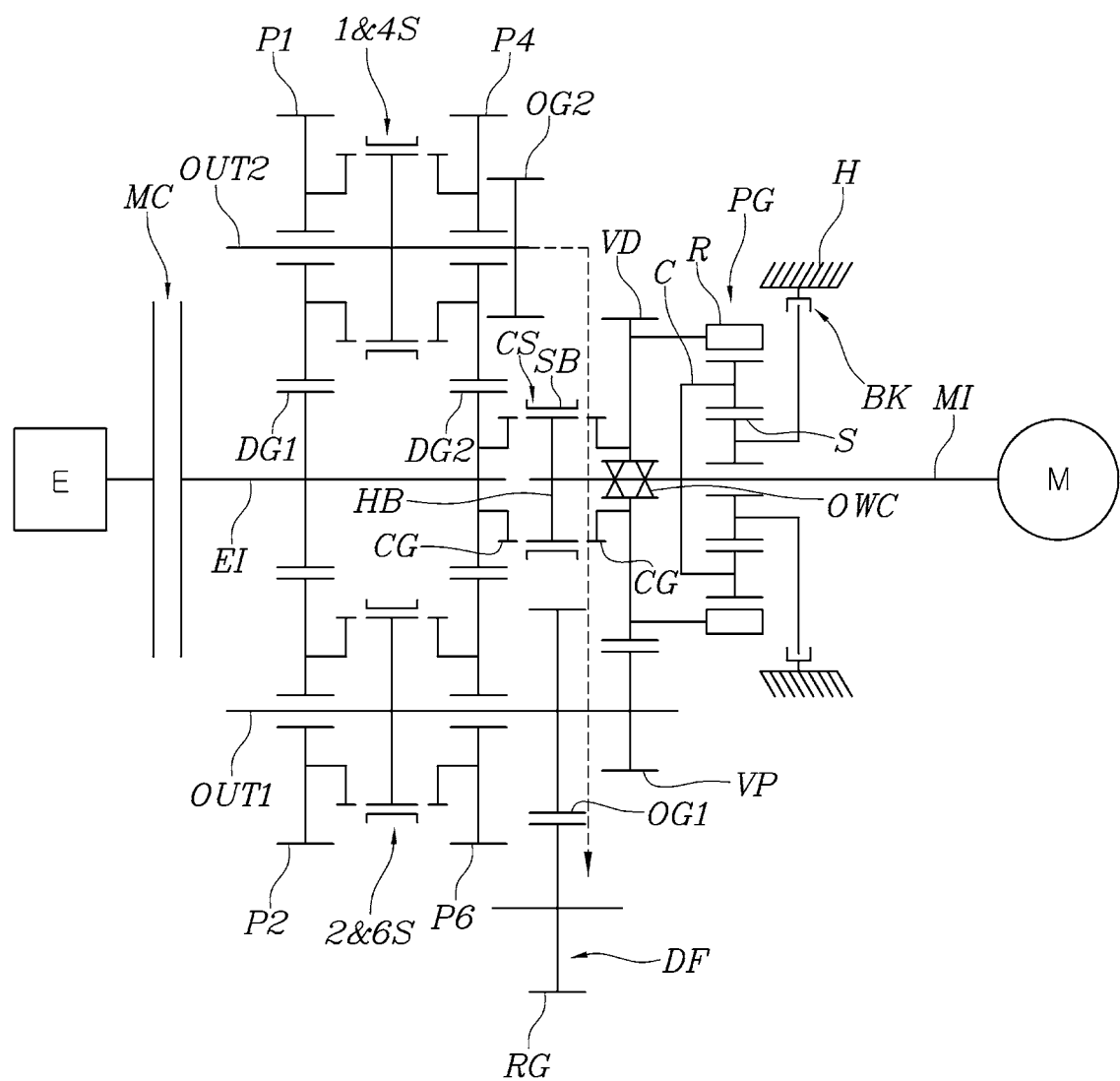
FIG. 9 is a diagram illustrating a hybrid powertrain for vehicles according to various exemplary embodiments of the present invention.

In another exemplary embodiment shown in FIG. 9, the rotation shaft of the motor M is directly connected to the motor input shaft MI.

Therefore, the driving power of the motor M directly drives the motor input shaft MI, and the powertrain according to the present exemplary embodiment of the present invention may require only the smallest number of portions and have a minimized and compact configuration.

Figure 10:
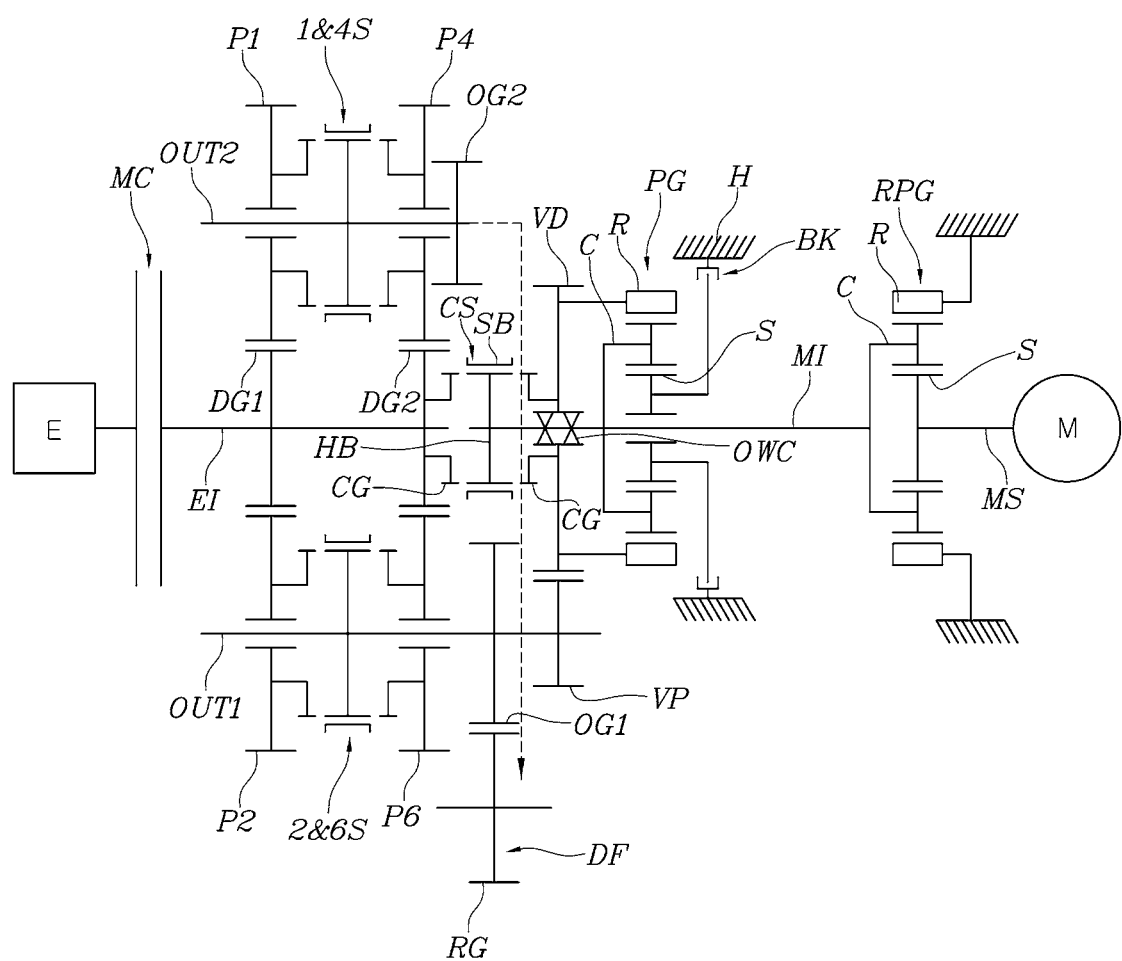
FIG. 10 is a diagram illustrating a hybrid powertrain for vehicles according to yet another exemplary embodiment of the present invention.

In yet another exemplary embodiment shown in FIG. 10, the motor input shaft MI is connected to the motor M by a planetary gear set RPG for reducing speed which reduces the rotation speed of the motor M and transmits the reduced rotation speed of the motor M to the motor input shaft MI.

That is, in addition to the planetary gear set RG connected to the variable driving gear VD, the planetary gear set RPG for reducing speed is further provided. The planetary gear set RPG for reducing speed primarily reduces the rotation speed of the motor M and then transmits the reduced rotation speed to the motor input shaft MI.

The planetary gear set RPG for reducing speed includes a ring gear R which is fixed to transmission housing H, a sun gear S which is connected to a motor shaft MS of the motor M, and a planet carrier C which is connected to the motor input shaft MI.

Hereinafter, a process of shifting the first speed stage to the sixth speed stage in the powertrain shown in FIG. 1 according to an exemplary embodiment will be described.

FIG. 2A, FIG. 2B, FIG. 2C, FIG. 2D and FIG. 2E are diagrams illustrating a process of shifting from the first speed stage to the second gear stage. FIG. 2A illustrates a driving state of the vehicle in the first gear stage, in which the main clutch MC is engaged, the first and fourth speed stage synchronization device 1&4S connects the driven gear P1 for the first speed stage to the second output shaft OUT2, the center synchronizer CS is in a neutral condition, and the power of the engine E drives the engine input shaft EI through the main clutch MC.

Here, the power of the engine input shaft EI is transmitted to the second output shaft OUT2 through the first driving gear DG1 and the driven gear P1 for the first gear stage, and is then output while forming the transmission gear ratio of the first speed stage through the second output gear OG2 and the ring gear R of the differential device DF.

When a command for instructing to shifting to the second speed stage is given, the center synchronizer is engaged with the variable driving gear VD, and the motor M is driven, as shown in FIG. 2B.

The main clutch MC is released, and the current driving state of the vehicle is maintained using the power of the motor M, as shown in FIG. 2C.

In the state in which the driven gear P2 for the second speed stage is locked onto the first output shaft OUT1 by the second and sixth speed stage synchronization device 2&6S, driving of the vehicle in the second speed stage is initiated by engaging the main clutch MC, as shown in FIG. 2D, and the vehicle enters a driving state in the second speed stage using only the engine E by releasing driving of the motor M, as shown in FIG. 2E.

Therefore, shifting is completed without torque interruption.

Figures 3A, 3B, 3C, 3D, 3E:
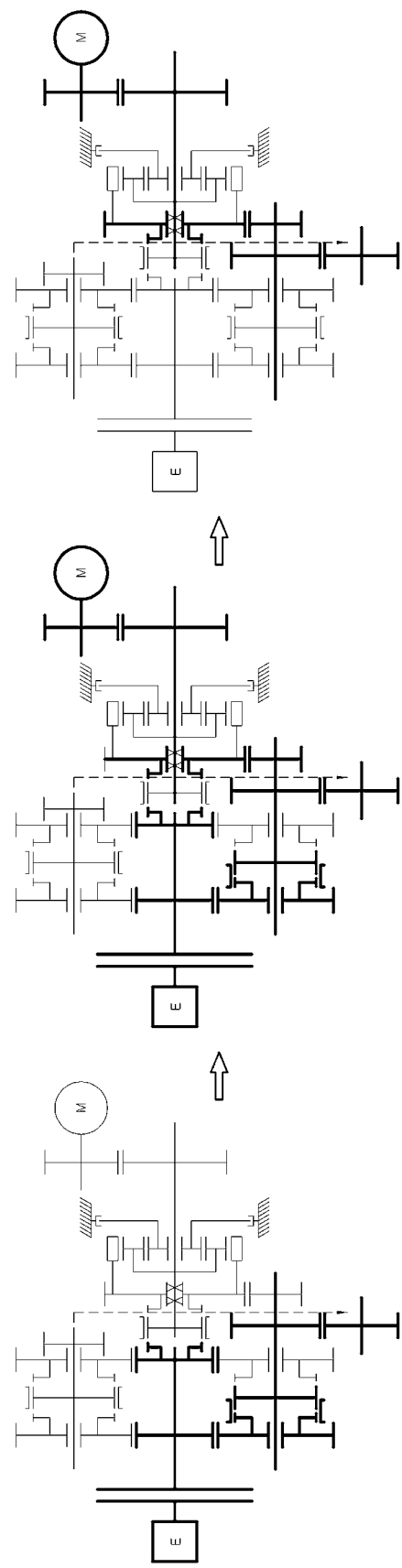
FIG. 3A, FIG. 3B, FIG. 3C, FIG. 3D and FIG. 3E are diagrams illustrating a process of shifting from the second speed stage to a third speed stage in the powertrain of FIG. 1.

FIG. 3A, FIG. 3B, FIG. 3C, FIG. 3D and FIG. 3E are diagrams illustrating a process of shifting from the second speed stage to the third gear stage. FIG. 3A illustrates a state in which the center synchronizer CS is changed into the neutral condition from the state of FIG. 2E.

When a command for instructing to shifting to the third speed stage is given, the motor M is driven to prepare for cutoff of power from the engine E, as shown in FIG. 3B.

The main clutch MC is released so that the driving state of the vehicle in the second speed stage is maintained using only the power of the motor M, as shown in FIG. 3C.

When the center synchronizer CS is moved to the left so that the engine input shaft EI and the motor input shaft MI are directly connected to each other and then the main clutch MC is engaged, the vehicle enters a driving state in the third gear stage, as shown in FIG. 3D, and when driving of the motor M is released, the driving state of the vehicle in the third speed stage is maintained using only the engine E, as shown in FIG. 3E. During the present shifting process, torque interruption does not occur.

FIG. 4A, FIG. 4B, FIG. 4C, FIG. 4D and FIG. 4E are diagrams illustrating a process of shifting from the third speed stage to the fourth gear stage. FIG. 4A illustrates the same state as FIG. 3E.

When a command for instructing to shifting to the fourth speed stage is given, driving of the motor M is initiated, as shown in FIG. 4B, the main clutch MC and the center synchronizer CS are released and the first and fourth speed stage synchronization device 1&4S connects the driven gear P4 for the fourth speed stage to the second output shaft OUT2, as shown in FIG. 4C, the vehicle enters a driving state in the fourth speed stage by engaging the main clutch MC, as shown in FIG. 4D, and then the driving state of the vehicle in the fourth speed stage is maintained using only the engine E by releasing driving of the motor M, as shown in FIG. 4E. Also, during the present shifting process, torque interruption does not occur.

FIG. 5A, FIG. 5B, FIG. 5C, FIG. 5D and FIG. 5E are diagrams illustrating a process of shifting from the fourth speed stage to the fifth gear stage. In the driving state of the vehicle in the fourth gear stage, as shown in FIG. 5A, when a command for instructing to shifting to the fifth speed stage is given, the motor M is driven while engaging the brake BK, and thus the driving state of the vehicle in the fourth speed stage is maintained additionally using the motor M, as shown in FIG. 5B.

Here, since the rotation speed of the motor M is increased by the planetary gear set PG and the variable driving gear VD and then the power of the motor M having the increased rotation speed is transmitted to the first output shaft OUT1, the motor M does not need to increase the RPM thereof while implementing driving of the vehicle in the fourth gear stage.

The main clutch MC is released, and the first and fourth speed stage synchronization device 1&4S is released into the neutral condition, as shown in FIG. 5C.

The motor input shaft MI is directly connected to the engine input shaft EI by the center synchronizer CS and then the main clutch MC is engaged so that the vehicle enters a driving state in the fifth gear stage, as shown in FIG. 5D, and then the driving state of the vehicle in the fifth speed stage is maintained using only the engine E by releasing driving of the motor M, as shown in FIG. 5E. Also, during the present shifting process, torque interruption does not occur.

FIG. 6A, FIG. 6B, FIG. 6C, FIG. 6D and FIG. 6E are diagrams illustrating a process of shifting from the fifth speed stage to the sixth gear stage. In the driving state of the vehicle in the fifth gear stage, as shown in FIG. 6A, when a command for instructing to shifting to the sixth speed stage is given, the motor M is driven and thus the driving state of the vehicle in the fifth speed stage is maintained additionally using the motor M, as shown in FIG. 6B, and then the main clutch MC is released and the center synchronizer CS is released into the neutral condition, as shown in FIG. 6C.

The second and sixth speed stage synchronization device 2&6S is engaged with the driven gear P6 for the sixth gear stage, and then the vehicle enters a driving state in the sixth speed stage by engaging the main clutch MC, as shown in FIG. 6D.

Thereafter, when driving of the motor M is released, the driving state of the vehicle in the sixth speed stage is maintained using only the engine E, as shown in FIG. 6E. Also, during the present shifting process, torque interruption does not occur.

That is, the hybrid powertrain according to an exemplary embodiment of the present invention may perform shifting from the first through sixth gear stages without torque interruption, thereby being capable of realizing excellent power transmission efficiency and shifting quality.

For reference, in the drawings, bold lines indicate portions to which power is transmitted, and downshifting is performed through a process similar to the above-described upshifting process and a detailed description thereof will thus be omitted.

FIG. 7A, FIG. 7B and FIG. 7C are diagrams illustrating a process of shifting from the first speed stage to the second speed stage in the powertrain in an electric vehicle mode in which the vehicle is driven using only the motor M. As shown in FIG. 7A, the motor M is driven under the condition that the brake BK is released to implement the driving state of the vehicle in the first speed stage using the motor M. When a command for instructing to shifting to the second speed stage is given, the brake BK is engaged, as shown in FIG. 7B, and the center synchronizer CS is released into the neutral condition to implement the driving state of the vehicle in the second speed stage using the motor M.

In the state shown in FIG. 7A, the driving state of the vehicle in the forward first speed stage may be implemented by the one-way clutch OWC, even when the center synchronizer CS is not engaged with the variable driving gear VD. However, as shown in FIG. 7A, when the center synchronizer CS is engaged with the variable driving gear VD, a reverse speed may be implemented by rotating the motor M in the reverse direction thereof.

FIG. 8A, FIG. 8B and FIG. 8C are diagrams illustrating a process of shifting from the second speed stage to the first speed stage in the powertrain in the electric vehicle mode. When a command for instructing to shifting to the first speed stage is provided under the driving state of the vehicle in the second speed stage using the motor M, as shown in FIG. 8A, the variable driving gear VD and the sleeve SB of the center synchronizer CS are synchronized by control to release the brake BK, and the center synchronizer CS is engaged with the clutch gear CG of the variable driving gear VD, as shown in FIG. 8B. Thereafter, when the brake B is completely released, downshifting to the first speed stage using the motor M is performed, as shown in FIG. 8C.

As is apparent from the above description, a hybrid powertrain for vehicles according to an exemplary embodiment of the present invention may improve shift feeling by eliminating torque interruption, which is a disadvantage of an automated manual transmission (AMT), using a motor, while reinforcing the advantages of the AMT, and obviate a clutch between the motor and an engine, required by a conventional hybrid powertrain in which the motor is located between the engine and a transmission, to improve ease of mounting of a transmission in a vehicle due to a reduction in the overall length of the transmission, to reduce the weight and production cost of the transmission, and to contribute to improvement in fuel efficiency of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain for a vehicle, the powertrain comprising:
   an engine input shaft selectively connectable to an engine by a main clutch;
   a motor input shaft mounted to be coaxial with the engine input shaft and engaged to a motor;
   a center synchronizer mounted to selectively connect the engine input shaft to the motor input shaft;
   a first output shaft and a second output shaft each mounted parallel to the engine input shaft;
   a variable driving gear mounted on the motor input shaft to maintain or increase a rotation speed of the motor input shaft and then to transmit the maintained or increased rotation speed to the first output shaft; and
a plurality of gear pairs mounted to form different transmission gear ratios between the engine input shaft and the first output shaft and between the engine input shaft and the second output shaft,
wherein a plurality of transmission gear ratios, formed by the plurality of gear pairs, and two transmission gear ratios, formed when the variable driving gear transmits power to the first output shaft, form a series of the different transmission gear ratios used to drive the vehicle, and
wherein a rotation shaft of the motor is fixedly connected to the motor input shaft.

2. The powertrain according to claim 1,
wherein the variable driving gear is mounted on the motor input shaft through a one-way clutch configured to transmit power in a direction from the motor input shaft to the variable driving gear, and
wherein the variable driving gear is connected to a third rotation element of a first planetary gear set including a first rotation element mounted to be selectively fixable by a brake to a transmission housing, and a second rotation element connected to the motor input shaft.

3. The powertrain according to claim 2, wherein the first rotation element, the second rotation element and the third rotation element of the first planetary gear set are a sun gear, a planet carrier and a ring gear, respectively.

4. The powertrain according to claim 2, wherein the variable driving gear is configured to be locked onto the motor input shaft by the center synchronizer.

5. The powertrain according to claim 4, wherein the center synchronizer includes:
a hub fixed on the motor input shaft; and
a sleeve mounted to be slidable on the hub in an axial direction of the motor input shaft, and configured to fixedly connect the hub to the engine input shaft when the sleeve is moved to a first side of the hub and to fixedly connect the hub to the variable driving gear when the sleeve is moved to a second side of the hub.

6. The powertrain according to claim 5,
wherein the center synchronizer is connected to the engine input shaft as a synchronization device configured to perform synchronous interaction using a synchronizer ring, and
wherein the center synchronizer is connected to the variable driving gear as a dog clutch.

7. The powertrain according to claim 1,
wherein the plurality of gear pairs includes a first plurality of gear pairs and a second plurality of gear pairs,
wherein the first plurality of gear pairs between the engine input shaft and the first output shaft are mounted to implement a transmission gear ratio of a second speed stage and a transmission gear ratio of a sixth gear stage among the different transmission gear ratios,
wherein the second plurality of gear pairs between the engine input shaft and the second output shaft are mounted to implement a transmission gear ratio of a first speed stage and a transmission gear ratio of a fourth gear stage among the different transmission gear ratios, and
wherein the variable driving gear is mounted to transmit power to the first output shaft at a transmission gear ratio of a third speed stage and a transmission gear ratio of a fifth gear stage among the different transmission gear ratios.

8. The powertrain according to claim 7,
wherein the first plurality of gear pairs and the second plurality of gear pairs include a first driving gear and a second driving gear in common,
wherein the first driving gear used to implement the transmission gear ratio of the first speed stage and the transmission gear ratio of the second speed stage in common and the second driving gear used to implement the transmission gear ratio of the fourth speed stage and the transmission gear ratio of the sixth speed stage in common are fixedly mounted on the engine input shaft,
wherein the first plurality of gear pairs includes a first driven gear for the second speed stage and engaged with the first driving gear and a second driven gear for the sixth speed stage and engaged with the second driving gear, the first driven gear and the second driven gear being rotatably mounted on the first output shaft, and
wherein the second plurality of gear pairs includes a third driven gear for the first speed stage engaged with the first driving gear and a fourth driven gear for the fourth speed stage engaged with the second driving gear, the third driven gear and the fourth driven gear being rotatably mounted on the second output shaft.

9. The powertrain according to claim 8,
wherein the first driving gear and the second driving gear are fixedly mounted on the engine input shaft so that rotation of the first driving gear and the second driving gear is locked onto the engine input shaft,
wherein a second and sixth speed stage synchronization device configured to selectively lock a rotation of the first driven gear for the second speed stage and the second driven gear for the sixth speed stage onto the first output shaft is mounted on the first output shaft, and
wherein a first and fourth speed stage synchronization device configured to selectively lock a rotation of the third driven gear for the first speed stage and the fourth driven gear for the fourth speed stage onto the second output shaft is mounted on the second output shaft.

10. The powertrain according to claim 8, wherein a clutch gear configured to form a portion of the center synchronizer is integrally mounted on the second driving gear.

11. The powertrain according to claim 10, wherein the clutch gear includes:
a first clutch gear connected to the second driving gear; and
a second clutch gear connected to the variable driving gear.

12. The powertrain according to claim 1,
wherein a first output gear is fixed to the first output shaft,
wherein a second output gear is fixed to the second output shaft, and
wherein the first output gear and the second output gear are in common engaged with a ring gear of a differential device.

13. The powertrain according to claim 1,
wherein a motor driven gear configured to receive power from the motor is fixed to the motor input shaft, and
wherein a motor driving gear fixed to a rotation shaft of the motor is engaged with the motor driven gear.

14. A powertrain for a vehicle, the powertrain comprising:
an engine input shaft selectively connectable to an engine by a main clutch;
a motor input shaft mounted to be coaxial with the engine input shaft and engaged to a motor;

a center synchronizer mounted to selectively connect the engine input shaft to the motor input shaft;

a first output shaft and a second output shaft each mounted parallel to the engine input shaft;

a variable driving gear mounted on the motor input shaft to maintain or increase a rotation speed of the motor input shaft and then to transmit the maintained or increased rotation speed to the first output shaft; and a plurality of gear pairs mounted to form different transmission gear ratios between the engine input shaft and the first output shaft and between the engine input shaft and the second output shaft, wherein a plurality of transmission gear ratios, formed by the plurality of gear pairs, and two transmission gear ratios, formed when the variable driving gear transmits power to the first output shaft, form a series of the different transmission gear ratios used to drive the vehicle, and wherein the motor input shaft is connected to the motor by a second planetary gear set for reducing a rotation speed of the motor and then to transmit the reduced rotation speed to the motor input shaft.

15. The powertrain according to claim 14, wherein the second planetary gear set includes a first rotation element, a second rotation element and a third rotation element, and wherein the first rotation element is connected to a motor shaft of the motor, the second rotation element is connected to the motor input shaft, and the third rotation element is connected to a transmission housing.

16. The powertrain according to claim 15, wherein the first rotation element, the second rotation element and the third rotation element of the second planetary gear set are a sun gear, a planet carrier and a ring gear, respectively.

* * * * *